July 28, 1959

R. F. BREWER ET AL 2,896,313

AUTOMATIC CONTROL FOR ASSEMBLY MACHINES

Filed Oct. 8, 1956

INVENTORS
R. F. BREWER
J. A. HOSFORD
J. W. McGRATH

BY

ATTORNEY

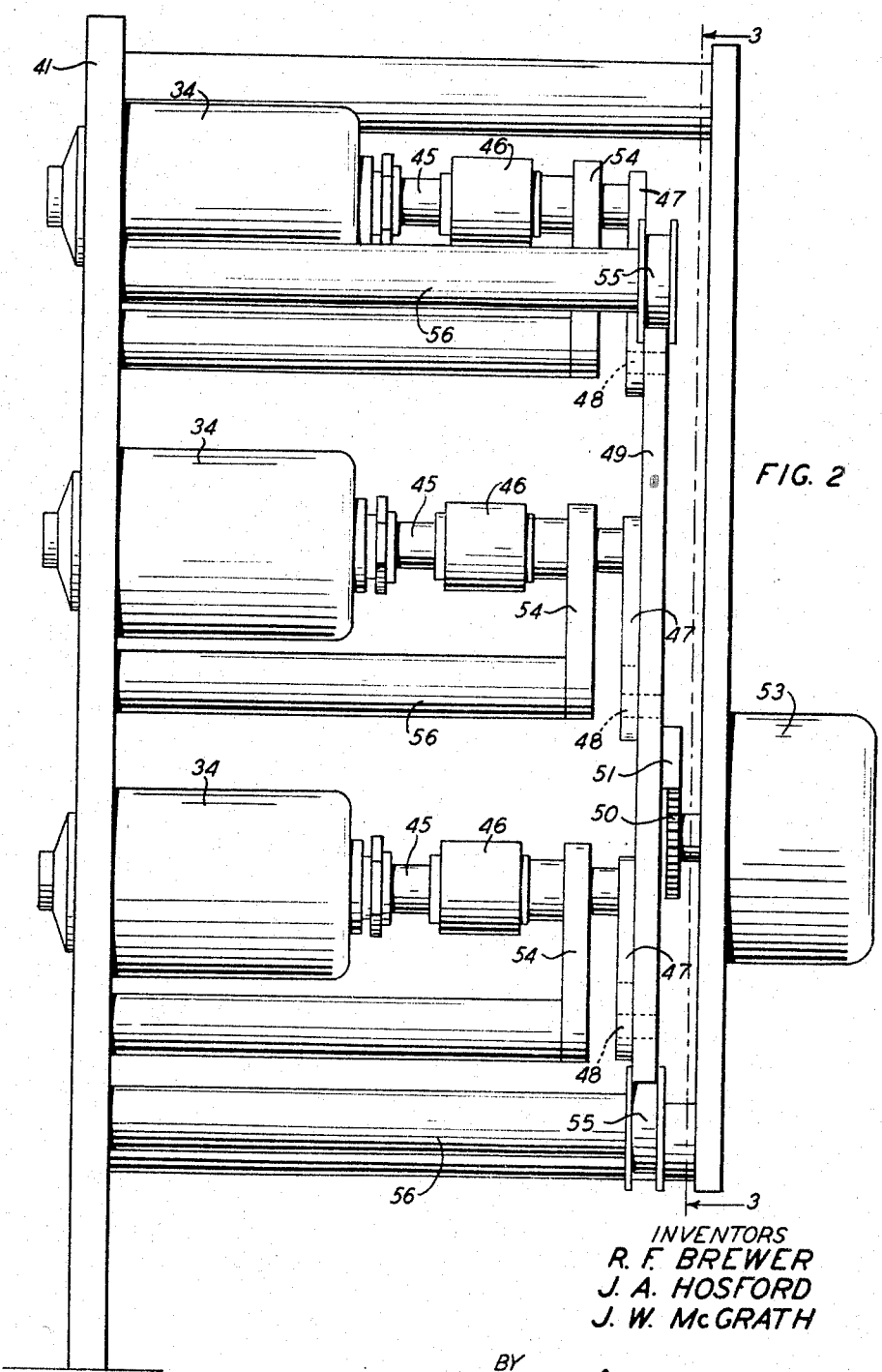

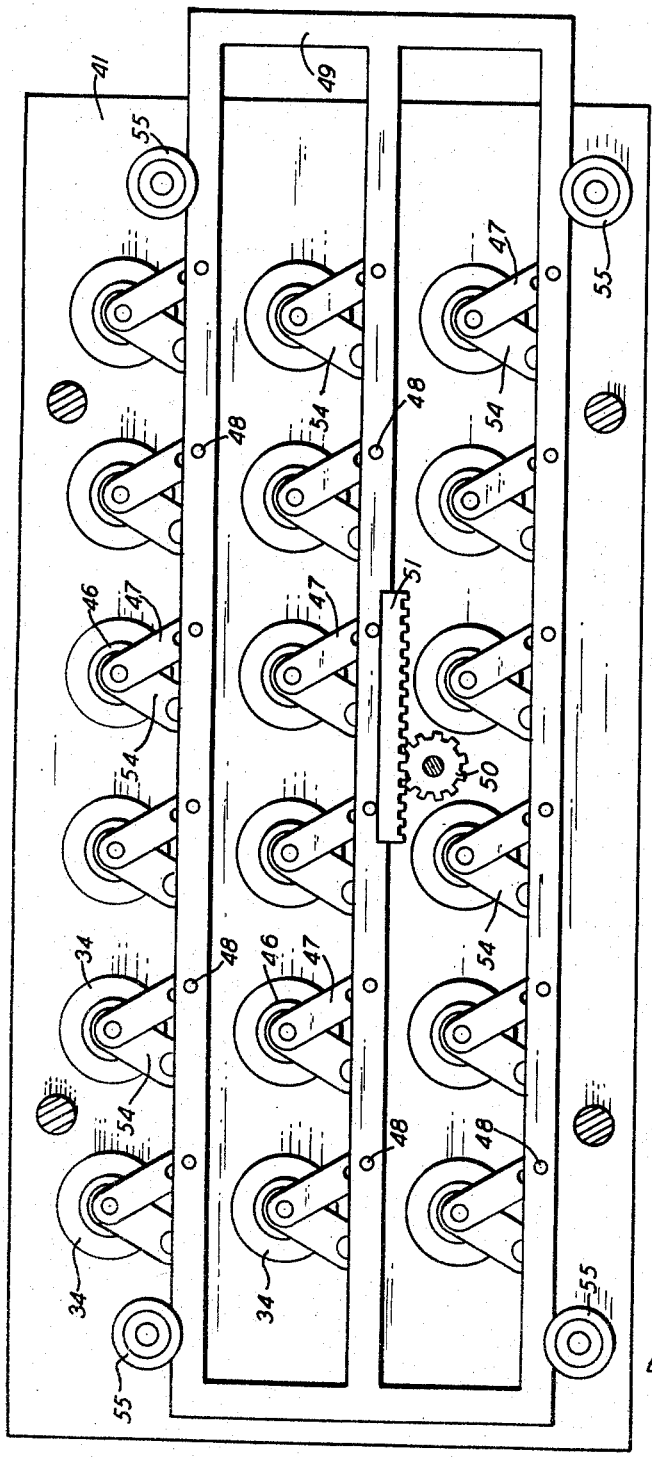

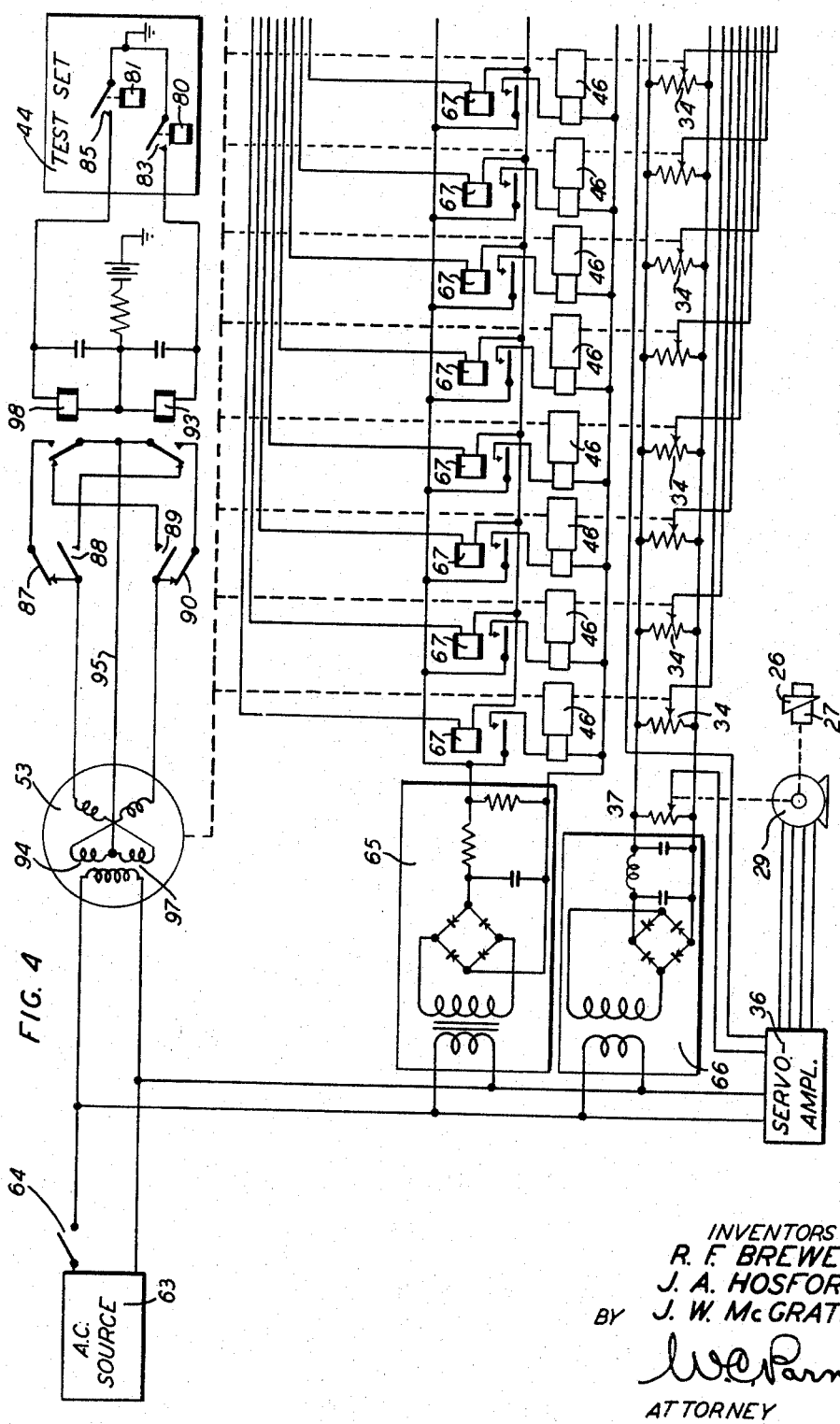

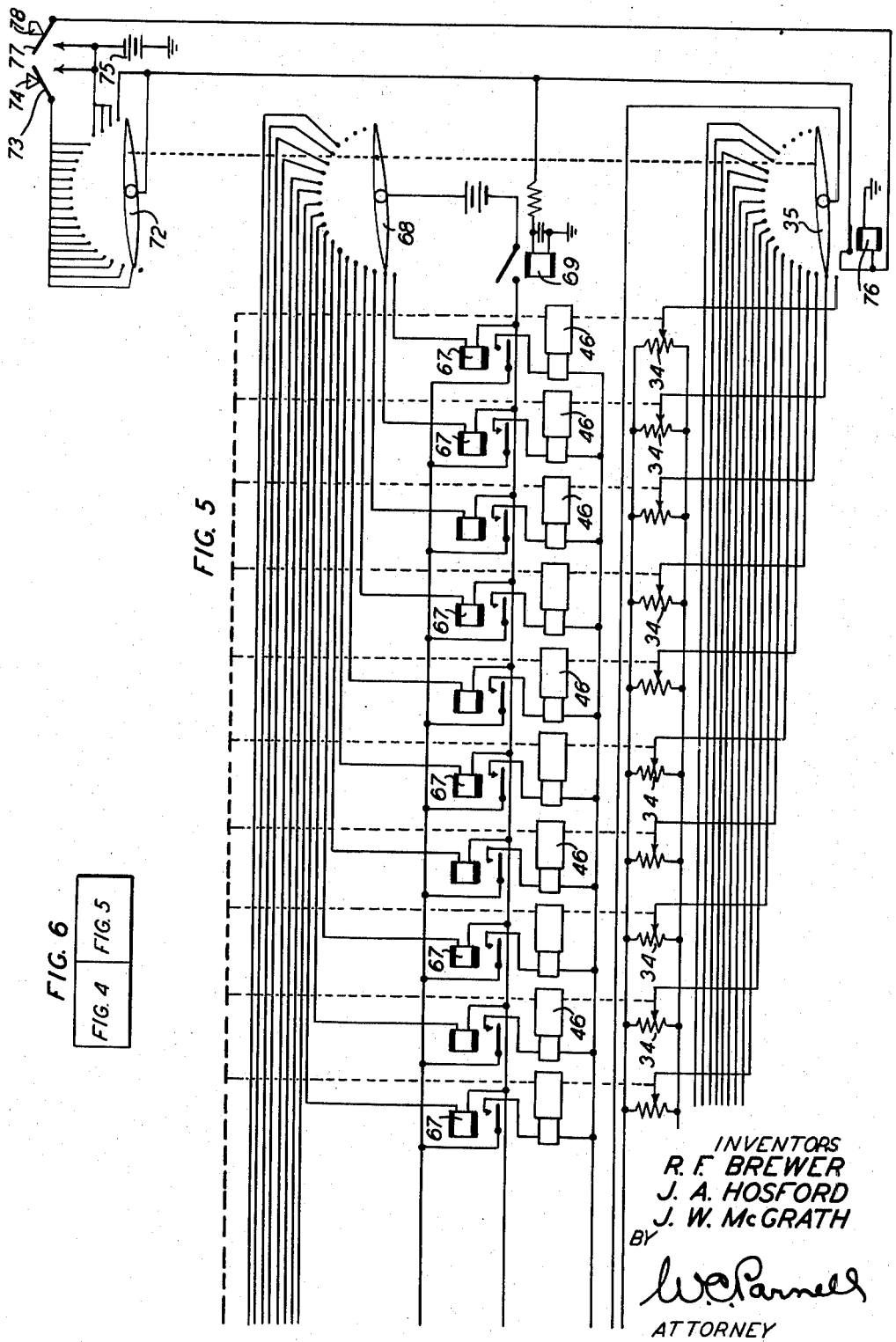

United States Patent Office 2,896,313
Patented July 28, 1959

2,896,313

AUTOMATIC CONTROL FOR ASSEMBLY MACHINES

Robert F. Brewer and James A. Hosford, Bethlehem, and John W. McGrath, Allentown, Pa., assignors to Western Electric Company, Incorporated, New York, N.Y., a corporation of New York Application October 8, 1956, Serial No. 614,741

9 Claims. (Cl. 29—203)

This invention relates to an automatic control for assembly machines having a plurality of assembly heads and particularly to individually controlling the positioning of elements to be assembled in each of the heads of such machines.

A machine for mass producing switches having a pair of flexible overlapping and spaced apart magnetically operable members or reeds disposed in opposite ends of a tubular envelope is disclosed in the co-pending application No. 505,172 of Messrs. R. F. Brewer and J. A. Hosford filed May 2, 1955. This machine comprises a plurality of identical heads on a turntable which individually function to automatically receive the elements of a switch, a glass tube and the two reeds, and hold them as the turntable is indexed to move each head through a number of stations in which the fabricating operations are performed. Completed switches are successively delivered to a fixture for testing with apparatus such as that disclosed in co-pending application No. 531,547 of Messrs. A. L. House and J. J. Monahan filed August 30, 1955, and there tested with a test set of the type disclosed in the co-pending application No. 531,518 of Messrs. F. Kulick, J. W. McGrath, and A. H. Spence filed August 30, 1955. In one series of operational tests, the switches are located within the field of a coil and known currents are passed through the coil while the operation or non-operation of the members or reeds of the switch are detected in associated circuits. In general, the current required in the coil for producing an electromagnetic field sufficient to operate the switch is determined by the gap or the spacing between overlapping ends of the magnetic members, the wider the gap, the larger the current must be.

In the aforementioned multiple head assembly machine, fixed camming means or actuators are utilized to cause relative movement between holders or grippers for the members to set the gap between them when the turntable successively moves the heads through a gap setting station. With this arrangement the mechanism in each individual assembly head is adjustable and is set so that the fixed camming means will cause uniformly spaced gaps to be produced in switches fabricated in each head.

It is the object of this invention to automatically control an actuator to position parts in each assembly head of such multiple head machines in accordance with their individual or particular requirements thereby making it possible to achieve uniform results without requiring manual adjustments in the mechanisms of each of the heads.

It is a further object of this invention to automatically make corrections in the setting of such an actuator in accordance with changes occurring in the individual heads during the operation of the machine.

In a preferred embodiment of the invention for fabricating switches of the aforementioned type in a multiple-head assembly machine, a plurality of potentiometers are utilized for "remembering" the position required for an actuator in the gap setting station for each of the individual heads, and a motor positions the actuator in accordance with the setting of each potentiometer as its corresponding head moves through the gap setting station.

For correcting the settings of the potentiometers when changes occur in the individual heads which varies the size of the resulting gap produced thereon, tests made on the switches, as they are successively delivered from the machine, are monitored and the setting of the potentiometer corresponding to the head on which a tested switch was made is automatically corrected to eliminate the deviation from normal in the operating characteristics of the tested switch. In this way a constant check is made on the operation of the machine and the automatic correction resulting therefrom assures the continuous large scale production of a uniform product.

These and other features of the invention will be more fully understood from the following detailed description taken in conjunction with the drawing, in which:

Fig. 2 is a side elevational view of the "memory" potentiometers for the individual assembly heads of the machine together with the adjusting means therefor;

Fig. 3 is a view of Fig. 2 along the plane of line 3—3 of Fig. 2;

Figure 1:
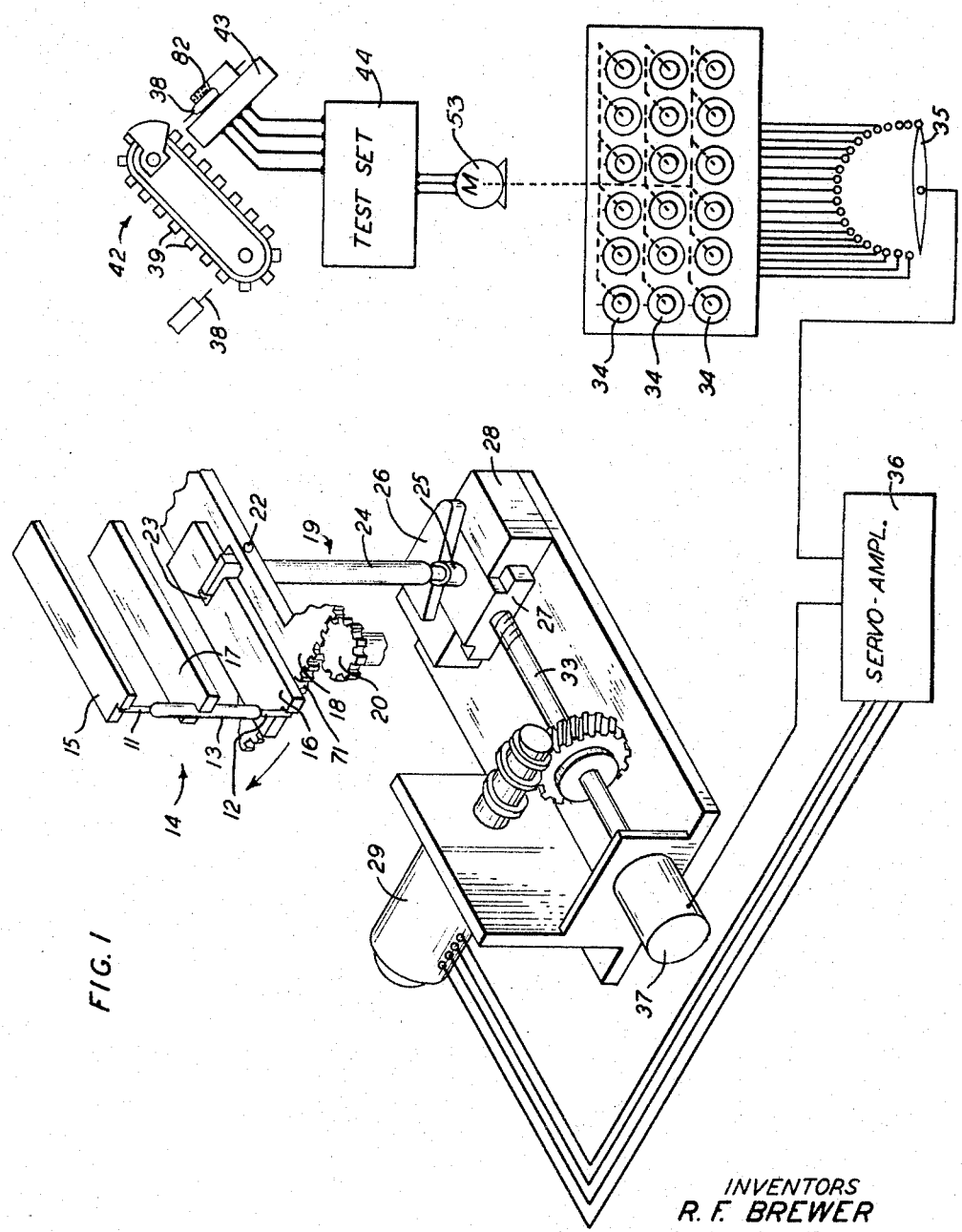
Fig. 1 is a simplified schematic representation of a system for automatically setting the gaps of dry reed switches in a multiple head assembly machine.

Figs. 4 and 5 comprise a schematic diagram of the control circuit for the system of Fig. 1; and Fig. 6 shows the arrangement of Figs. 4 and 5.

Referring now to the drawing, attention is first directed to Fig. 1 showing a simplified schematic representation of a system for setting a prescribed gap between the overlapping ends of electrodes or reeds 11 and 12 within a glass tube 13 in the fabrication of dry reed switches on a multiple head assembly machine of the type disclosed in the aforementioned application of Messrs. R. F. Brewer and J. A. Hosford. The basic parts of this system are the assembly heads 14 on the machine; a servo-motor controlled actuator or cam 26 for setting the gaps in switches in the heads; a servo-amplifier 36; a plurality of "memory" potentiometers 34 to control the positioning of the actuator 26 for each of the heads 14; a conveyor 42; a test fixture 43; a test set 44 and a motor 53 for correcting the settings for the potentiometers 34.

The reeds 11 and 12 and the tube 13 are held in one of the eighteen identical assembly heads 14 of the machine with chuck or gripper members 15, 16 and 17, respectively. The details of the gripper mechanism are not shown, since they are not part of this invention; they may be, however, similar to those disclosed in the aforementioned application. The gripper member 16 for the reed 12 is slidable longitudinally on an intermittently driven turntable base plate 18 through actuation of a lever 19 to bring about setting of the gap between the reeds 11 and 12. The rod 19 is pivoted to the plate 18 at 22, the upper end of the rod being positioned in a slot 23 in the member 16. The upper end of the rod is short as measured from the pivot, compared to the lower extension 24, the end of which carries a cam follower 25. With the pivot 22 located near the upper end of the rod 19, a small longitudinal movement of the member 16 is effected as compared to the longer motion on the cam follower on the longer end of the rod 19 when the assembly machine turntable is indexed by the drive gear 20 to move one of the heads past a cam or actuator 26 in a gap setting station to set the gap.

The cam 26 is mounted on a slide 27 which is movable in a guide block 28 by means of a servo-motor 29 which drives a threaded shaft 33 in and out of the slide 27. The motor 29 moves the cam 26 to a position required to move the member 16, in the head 14, a distance required to set a prescribed gap between the reeds 11 and 12.

In order to control the positioning of the cam 26 for each of the individual eighteen heads on the machine, a separate pre-set "memory" potentiometer 34 is provided. The "memory" potentiometer corresponding to the assembly head being indexed through the gap-setting station is connected, by means of a selector switch 35, into the input circuit of a servo amplifier 36 for the motor 29 to control the operation of the motor to relocate the cam 26 from the position required for the previous head to the position required for the particular head 14 then moving through the gap setting station. The unbalanced potential between the output of the "memory" potentiometer and a variable potentiometer 37 driven by the motor, which is also connected in the input circuit of the amplifier, determines the direction and amount the motor is driven.

After the gap has been set, the turntable is indexed to move the head 14 through subsequent stations to complete the fabrication of the switch. Completed switches 38 are fed out of the machine and are deposited successively into receptacles 39 of the conveyor 42 (of the type disclosed in the aforementioned application of Messrs. A. L. House and J. J. Monahan) which permits the switches to cool and carries them to the test fixture 43. The deviation in the gap in each switch from a normal value may be ascertained from the results of tests performed on the switches 38 by the test set 44, which may be of the type disclosed in the aforementioned F. Kulick-J. W. McGrath-A. H. Spence application. This information may be utilized to control the motor 53 to make incremental corrective adjustments in the settings of the "memory" potentiometer 34 corresponding to the head in which the tested switch was fabricated in order to correct the size of the gap produced in subsequent switches fabricated in the respective heads. This system is therefore a self-correcting one.

Referring now to Figs. 2 and 3 in which the adjusting mechanism for the potentiometers 34 is shown. The potentiometers 34 are conventional multiple turn resistance type having adjusting shafts 45. The potentiometers are mounted in three rows on a fixed panel 41 and each of the shafts 45 are connected to one side of an electromagnetic clutch 46 which is conventional and a commercially available device. Electrical connections are made to each of the clutches 46. However, this may be done in a conventional manner; these connections therefore have been omitted from the drawing. The other sides of the clutches 46 are connected to levers 47 having slotted ends for receiving pins 48 on a movable carriage 49. The carriage may be driven to the right or to the left from a normal position where the levers 47 are aligned vertically by means of a rack 51 driven by a pinion 50 on the output shaft of a reversible motor 53. As seen in Fig. 3, the rack has been driven to its right limit, thereby rotating the levers 47 about thirty degrees from their normal vertical position where the motor gear is located about mid-position on the rack. Fixed support members 54 extending from the panel 41 are provided between the clutches 46 and the actuator arms 47. The carriage 49 is supported for its restricted reciprocating motion by means of grooved rollers 55 mounted on the end of extensions 56 also fixed to the panel 41. As the carriage is moved, the levers 47 will be rotated to turn the shafts 45 of the potentiometers 34 only when the electromagnetic clutches 46 are actuated. The motor 53 is controlled by switches actuated by the rotation of the motor which will be discussed in detail below. These switches may be mounted by conventional means for operation by the motor shaft or by the rack. In order to simplify the drawing, this structure has been omitted.

In the detailed electrical schematic diagram of Figs. 4 and 5, in which the components already mentioned have been given the same designation numeral, an alternating current source 63 supplies through control switch 64, field excitation to the "memory" potentiometer adjusting motor 53, power to a rectifier 65 for operating the electromagnetic clutches 46, and power to a rectifier 66 for supplying power for the potentiometer 37 and the "memory" potentiometers 34 which are connected in parallel across the output thereof. The variable output of the potentiometer 37, which is driven by motor 29, is connected directly to the input of the servo amplifier 36 and the variable outputs of the "memory" potentiometers 34 are connected to the fixed contacts of selector switch 35, the movable armature of which is also connected to the input of the amplifier 36. The switch 35 is one bank of a ganged selector switch which is stepped by an actuator 76 in synchronism with the indexing of the assembly machine.

The electromagnetic clutches 46 are successively energized by the closing of contacts of corresponding control relays 67 which are successively energized through contacts of a relay 69 and the armature of a selector switch 68 which is a second bank on the ganged switch. Relay 69 is a conventional relay whose release is delayed by a condenser connected across its winding. The relay 69 is energized through the armature of selector switch 72 which forms a third bank of the ganged switch. A micro-switch 73 which may be mounted on a fixed structural member (not shown) associated with the turntable or conveyor 42 is momentarily closed every time the assembly machine turntable is indexed one position (by means of the gear 70 driving the turntable ring gear 71). A plurality of cams 74, one for each head of the machine or each receptacle 39 of the conveyor, is used to momentarily close the switch 73 every time the machine is indexed. The first eighteen contacts of a twenty-two contact conventional step or selector switch 72 are connected together through the switch 73 to a battery 75 so that every time the switch 73 is operated, an energizing pulse is transmitted to the relay 69, which operates, and also to the actuator 76 which steps the selector switch in synchronism with the assembly machine. Another micro-switch 77, which may be mounted on the same support as switch 73, is closed by another cam 78 (on either the turntable or the conveyor) once every complete cycle of the turntable or once for every eighteen indices thereof. When switch 77 is closed, a circuit is completed through the armature of switch 72 and the actuator 76 to continuously step the ganged switch to the first position which is the only open position in the energizing circuit. This makes the ganged switch self-synchronizing and insures connecting corresponding "memory" potentiometers 34 and clutches 46 for the respective assembly heads which produces the switches 38 as they are tested in the test fixture 43. In practice, the switches 35 and 68 could be separate banks on the ganged selector switch in the test control circuit of the test set of the aforementioned application which correlates the switch under test with the proper one of eighteen recorders. Since the switch under test may not necessarily have been produced on the assembly head 14 then moving through the gap setting station, switch 35 is not necessarily synchronized to connect to the input of the servo amplifier the output of the "memory" potentiometer corresponding to the same head as that to which switch 68 is set. In other words, the wiring of the contacts of switch 35 may be staggered a certain number of positions from the wiring of the contacts of switch 68. It is to be noted that, as described in the aforementioned F. Kulick, J. W. McGrath, and A. H. Spence application, the conveyor 42 must have a number of receptacles 39 equivalent to eighteen or a whole number times eighteen so that successive completed switches are always received by the same receptacles 39 of the conveyor and the selector switch 68 may then be automatically set to the contact corresponding to the one of the eighteen heads on the machine in which the switch under test was fabricated.

In the test set a dry reed switch is positioned in the field of a coil 82 (Fig. 1) and, if a current is required in the test coil greater than that prescribed for the normal operation of the switches in order to close or operate the switch, a signal to that effect may be obtained as by the operation of a relay 80 in the test set. If relay 80 operates its contacts 83 will close to complete a circuit for a motor control relay 93 which will operate to close a circuit to drive motor 53 in a direction to adjust the setting of the "memory" potentiometer corresponding to the head on which the switch under test was fabricated to reduce the gap the next time that head is moved through the gap setting station since the clutch 46 for the "memory" potentiometer 34 corresponding to that head will be energized through the switch 68 and the operated contacts of relay 69. In the event the test indicates that less than a prescribed current is required in the field of the coil 82 in the test fixture, indicating that the gap of the tested switch is too small, relay 81 in the test set will operate and its operated contacts will complete the energizing circuit of a motor control relay 98 which thereupon operates to complete the circuit to drive motor 53 in the opposite direction and thereby adjust the setting of the corresponding "memory" potentiometer in the opposite sense so that the gap produced in a switch on that head the next time it is moved through the gap setting station will be increased. The relay 69 associated with the selector switch 68 has its release delayed sufficiently so that the relay 67 for actuating the clutch 46 corresponding to the head on which the switch under test was fabricated will remain operated until after the motor 53 has made the required correction on the "memory" potentiometer whereupon the relay 69 will release prior to the resetting of the motor 53.

The motor 53 is a reversible single-phase shaded pole motor which, as mentioned above, is normally set to a position in which the carriage 49 for adjusting the setting of the "memory" potentiometers locates the levers 47 vertically. Four micro-switches 87, 88, 89 and 90 are provided for stopping the motor after it has driven the rack 51 a certain amount to the right or to the left from its normal position and to return it to its normal position after a correction has been made in the setting of one of the "memory" potentiometers 34. Switches 87 and 90 are limit switches which are normally closed and are opened when the rack has been moved to either its left or right limit position, respectively. Switches 88 and 89, which are normally open, are closed whenever the motor is driven off of its normal position to the right and left, respectively. To make a correction in the setting of one of the "memory" potentiometers 34, relay 93, for example, is operated in response to the momentary closing of contacts 83 in the test set (for reducing the gap set in subsequent switches fabricated in the assembly head corresponding to the one in which the switch under test was fabricated) whereupon the coil 94 of the motor will be closed through the normally closed switch 90, the operated contacts of relay 93 and the common lead 95. The motor thereupon will be driven in one direction closing the "return" switch 88 preparatory to returning the motor to its normal position after the correction has been made. The motor will continue to drive until the limit switch 90 is opened by the movement of the rack to its extreme position in the driven direction. The relays 93 and 98 are slow release type relays which permit the motor 53 circuit to be closed sufficiently long to make the correction required although the contacts 83 or 85 of the test set may be closed only momentarily. By the time relay 93 releases, the relay 69 in the clutch energizing circuits, whose release is delayed until the "memory" potentiometer correction is completed, will have released so that the clutches will be de-energized prior to the resetting of the motor 53 driven rack. On the release of relay 93, the return circuit for the motor 53 is established through the back contacts of relay 93, the operated contacts of the switch 88, and the common lead 95 thereby closing the circuit for coil 97 which drives the motor back to relocate the rack to its mid-position where the switch 88 will be opened to stop the motor. The motor, therefore, is now ready for its next operation, which will occur after the selector switch 68 is stepped to its next position. The correction of the "memory" potentiometers 34 may be made in the opposite direction in a similar manner when contacts 85 of the test set are closed whereupon relay 98 operates and the motor coil 97 circuit is closed to drive the motor in the opposite direction. In this case, the return switch 89 is opened when the motor drives from its normal position to prepare the return after the correction has been made and the motor will drive until the limit switch 87 is opened when the rack is driven to its extreme position in this opposite direction. Then when relay 98 releases (after the clutch 46, corresponding to the head on which the switch under test has been fabricated, has been de-energized by the release of relay 69) the motor will be energized to relocate the rack in its normal position when the circuit for the motor coil 94 is closed through the closed switch 89, the back contacts of relay 98 and the common lead 95. The motor will stop when the rack reaches its normal position by the opening of switch 89.

The amount of correction produced by operation of motor 53 through an energized clutch 46 is only about thirty degrees or one-twelfth of a complete turn on the potentiometer shafts. This is a small increment as compared to the total adjustment available on the potentiometer. In actual practice, the adjustment made is equal to about one-tenth of the allowable range between upper and lower limits and every time a switch is tested, contacts 83 or 85 will be operated so that some adjustment will be made in the "memory" potentiometer corresponding to the head on which a switch under test was fabricated. The gaps produced on the heads will therefore vary alternately from slightly smaller than the prescribed value to slightly greater than the prescribed value.

It is also possible to utilize this system for making corrections in the "memory" potentiometer settings only when the gap in a tested switch is above or below prescribed limit values. In this case, the magnitude of correction might be in the order of one-half of the allowable range between lower and upper limits so that the correction in the "memory" potentiometer 46 would result in gaps approximately of the prescribed value. In such an arrangement the relays 80 and 81 in the test set will be operated only when the gap of a tested switch are outside of the prescribed limits.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an assembly machine for fabricating articles having spaced members, the combination with a plurality of assembly heads each having gripping means for each of the spaced members, at least one of said gripping means being movable, and means for successively moving the heads through a number of stations, of means for one of the stations for automatically controlling the relative positioning of the gripping means for the heads as they are successively moved through the station to produce a prescribed spacing between said spaced members comprising a movable actuator in said one of the stations for causing relative movement between the gripping means of each head as it is moved through the station, a motor for driving the actuator, motor control means for each of the heads for causing the motor to move the actuator to prescribed positions as required for each of the individual heads, and switching means responsive to movement of the heads for connecting corresponding motor control means to the motor as the heads are successively moved into the station.

2. In an assembly machine for fabricating articles having spaced members, the combination with a plurality of assembly heads each having gripping means for each of the spaced members, an actuator on the assembly machine for causing relative movement of the gripping means, and means for successively moving the heads into operative relation with the actuator, of means for automatically positioning the actuator for each head as it is moved into operative relation therewith comprising a potentiometer for each of the heads, a motor for driving the actuator, means for energizing the motor to position the actuator an amount and in a direction corresponding to the setting of the potentiometers, and switching means responsive to movement of the heads for connecting corresponding potentiometers to the motor energizing means as the heads are successively moved into operative relation with the actuator.

3. In an assembly machine for fabricating articles having spaced members, the combination with a plurality of assembly heads each having gripping means for each of the spaced members, an actuator on the assembly machine for causing relative movement of the gripping means, means for successively moving the heads into operative relation with the actuator, and means for successively testing articles assembled on the machine to ascertain whether the spacing between the members is greater or less than a prescribed value, of means for automatically positioning the actuator for each head as it is moved into operative relation therewith comprising a potentiometer for each of the heads, a motor for driving the actuator, means for energizing the motor to drive the actuator to positions corresponding to the settings of the potentiometers, switching means responsive to movement of the heads for connecting corresponding potentiometers to the motor energizing means as the heads are successively moved into operative relation with the actuator, and means responsive to the results of the tests for adjusting the setting of each of the potentiometers.

4. In an assembly machine for fabricating articles having spaced members, the combination with a plurality of assembly heads each having gripping means for each of the spaced members, at least one of said gripping means being movable, and means for successively moving the heads through a number of stations, of means for one of the stations for automatically controlling the relative positioning of the gripping means for the heads as they are successively moved through the station to produce a prescribed spacing between said spaced members comprising a movable actuator for causing relative movement between the gripping means as the heads are moved through the station, a motor for driving the actuator, adjustable motor control means associated with each of the heads for causing the motor to move the actuator to prescribed positions as required for the individual heads, switching means responsive to movement of the heads for connecting corresponding motor control means to the motor as the heads are successively moved into the station, and means for selectively making incremental adjustments in the motor control means.

5. In an assembly machine according to claim 4 in which the adjustable control means comprise potentiometers and the means for making incremental adjustments in the potentiometers comprises a motor, means operable by the motor for changing the settings of the potentiometers and means responsive to external signals for driving the motor a prescribed amount and direction.

6. In an assembly machine according to claim 4 in which the adjustable control means comprise potentiometers and the means for making incremental adjustments in the potentiometers comprises a motor, means controlled by the motor for changing the settings of the potentiometers, means responsive to external signals for driving the motor a prescribed amount and direction, clutches connected between the potentiometers and the motor controlled adjusting means and means for selectively actuating the clutches.

7. In an assembly machine according to claim 4 in which the adjustable control means have rotatable shafts for varying the settings thereof, normally non-actuated clutches connected to each of the shafts, a common reversible drive for the clutches and means for selectively actuating the clutches for a predetermined time.

8. In an assembly machine according to claim 7 in which the common drive includes a reversible motor having a normal starting position, means responsive to external signals for causing the motor to drive a prescribed amount in a prescribed direction when one of the clutches is actuated and means for causing the motor to reverse and drive back to its starting position after the actuated clutch is returned to its normal non-actuated condition.

9. In an assembly machine according to claim 4 in which the adjustable control means have rotatable shafts for varying the settings thereof, normally non-actuated clutches connected to each of the shafts, means operable in synchronism with the moving of the assembly heads for successively actuating the clutches for a prescribed time and a common drive for the clutches including a reversible motor having a normal starting position, means responsive to external signals for causing the motor to drive a prescribed amount in a prescribed direction when one of the clutches is actuated and means for causing the motor to reverse and drive back to its starting position after the actuated clutch is returned to its normal non-actuated condition.

References Cited in the file of this patent

UNITED STATES PATENTS

| | | |
|---|---|---|
| 2,337,667 | Kuehlman | Dec. 28, 1943 |
| 2,406,008 | Ellwood | Aug. 20, 1946 |
| 2,559,369 | Phillips | July 3, 1951 |
| 2,648,167 | Ellwood | Aug. 11, 1953 |